United States Patent
von der Wense et al.

(10) Patent No.: US 6,598,107 B1
(45) Date of Patent: Jul. 22, 2003

(54) METHOD FOR COMMUNICATING DATA ON A SERIAL BUS

(75) Inventors: Hans Christian von der Wense, Ilmmuenster (DE); István Horváth, Torslanda (SE); Antal Rajnák, Torslanda (SE)

(73) Assignees: Motorola, Inc., Schaumburg, IL (US); Volcano Communications Technologies, AB, Frolunda (SE)

( * ) Notice: Subject to any disclaimer, the term of this patent is extended or adjusted under 35 U.S.C. 154(b) by 0 days.

(21) Appl. No.: 09/564,516

(22) Filed: May 4, 2000

(30) Foreign Application Priority Data

May 5, 1999 (EP) .............................. 99108871

(51) Int. Cl.⁷ .......................... G06F 13/00; G06F 13/14
(52) U.S. Cl. ................... 710/305; 710/100; 703/16; 714/1; 714/14; 348/97; 375/316
(58) Field of Search ................ 703/16, 100; 710/313, 710/305, 306, 23; 714/1, 4; 348/97; 375/316

(56) References Cited

U.S. PATENT DOCUMENTS

| | | | | |
|---|---|---|---|---|
| 5,123,032 A | * | 6/1992 | Hershberger et al. ....... | 375/316 |
| 5,475,854 A | * | 12/1995 | Thomsen et al. ............. | 710/23 |
| 5,548,327 A | * | 8/1996 | Gunday et al. ............... | 348/97 |
| 5,600,782 A | * | 2/1997 | Thomson ...................... | 714/4 |
| 5,666,480 A | * | 9/1997 | Leung et al. .................. | 714/1 |
| 6,094,700 A | * | 7/2000 | Deschepper et al. ........ | 710/313 |
| 6,338,032 B1 | * | 1/2002 | Chen ........................... | 703/16 |

FOREIGN PATENT DOCUMENTS

| | | | | |
|---|---|---|---|---|
| EP | 0539096 A1 | 4/1993 | ........... | H04L/12/40 |
| EP | 0620664 A2 | 10/1994 | ........... | H04L/12/28 |

* cited by examiner

*Primary Examiner*—Glenn A. Auve
*Assistant Examiner*—Tim Vo

(57) ABSTRACT

The present invention relates to a method of communicating data between at least two units (1) on a serial bus (2) in a car, wherein the units 11) have independent clocks, the data being transmitted as a sequence (3) of frames (4), each frame including an identifier field (9) and a data field (10).

In order to ensure an always reliable and synchronized communication of data on a serial bus with different types of units (clocks) where randomly distributed periods of idle time may occur on the bus it is suggested that prior to any sequence (3) of frames (4), a signal pattern (7) is transmitted on the bus (2), so as to set the bus to a definite state for a predetermined period of time.

10 Claims, 2 Drawing Sheets

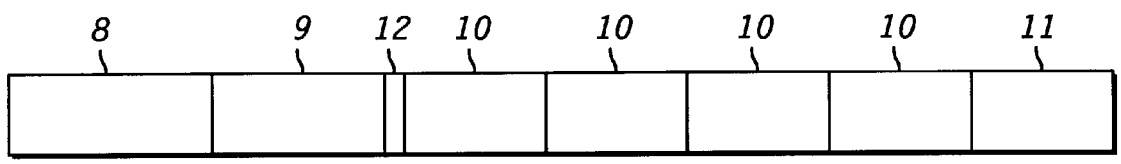
*FIG. 2B*
*FIG. 3*
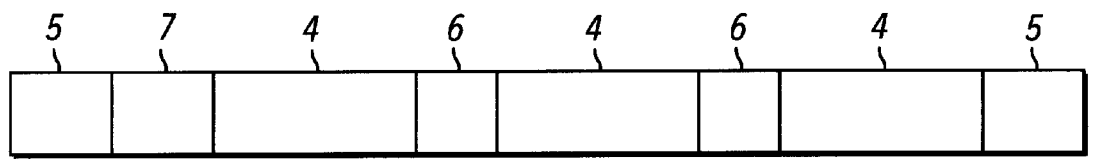

METHOD FOR COMMUNICATING DATA ON A SERIAL BUS

FIELD OF THE INVENTION

The present invention relates to a method for communicating data between at least two units on a serial bus, wherein the units have independent clocks and said data are transmitted as a sequence of frames, each frame including an identifier field and a data field. In particular the invention relates to communicating data on a serial bus in a car.

BACKGROUND OF THE INVENTION

In up to date cars microcontrollers are provided e.g. for controlling the combustion engine, the anti-lock brake system (ABS), window lifters, door locks, and the adjustment of driver/passenger seats and mirrors. However, the connection of the microcontrollers with each other by wire would contribute considerably to the weight of the car with a negative impact on the fuel consumption. Therefore mechanical elements such as actuators, sensors, etc. are combined with a corresponding microcontroller. Thus local data need not be transmitted to a central processing unit but are processed in the local microcontroller of the unit, and control wires between each unit and the central control unit of the car are reduced to the minimum necessary number. For communicating data between the units a multiplexed serial bus is provided. On the serial bus a predetermined protocol rules the communication of the data. An example of such a bus system and protocol is the Controller Area Network (CAN)—which provides the communication back bone in up to date cars.

It is essential for the protocol on a bus that each of the units refers to and is synchronized with a common clock signal. To this end each unit is provided with a clock and the clocks of all units are synchronized once the protocol is implemented on the bus.

The clocks of the units must meet the requirements of a sufficient time resolution, high frequency stability and high thermal stability. Stable and fast local oscillators are therefore based on crystals. Yet, crystals are expensive and raise the production costs of the bus system. As an alternative to crystal based oscillators RC-circuits can be used as local clocks. RC-circuits, however, are inaccurate. They are subject to variations and fluctuations of characteristic values. In particular the RC-frequency may vary in a range between 50% and 200% of its nominal value. In order to reduce the variations of the circuitry additional end-of-line calibration is necessary. Depending on the type of the oscillator circuit the oscillator frequency may eventually be adjusted to a maximum deviation of +/−15% of its nominal value.

In order to reduce current consumption most of the units in a car disconnect from the bus and change to a stand-by mode after a certain period of idle time. When they are addressed on the bus again the units must start up from their stand-by mode and may have to be re-synchronized. Synchronizing the circuit may be very time consuming, depending on the type of the unit. If the start up time of a unit is rather long a first frame of data may already be on the bus, and this data package may get lost because the destination unit was not yet ready for receiving it.

Therefore, a method is needed to ensure an always reliable and synchronized communication of data on a serial bus with different types of units (clocks) and with randomly distributed periods of idle time on the bus.

BRIEF DESCRIPTION OF THE DRAWINGS

FIG. 2B is an illustration of a single frame in the sequence of FIG. 2A; and

FIG. 3 is an illustration of a sequence of frames on the bus according to the present invention.

DETAILED DESCRIPTION OF A PREFERRED EMBODIMENT

Figure 1:
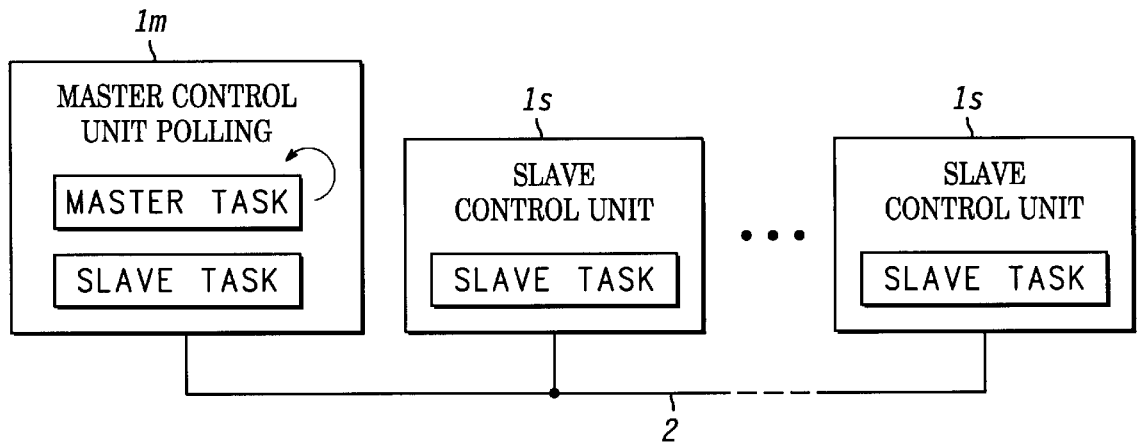
FIG. 1 is a diagram of a bus system with several units.

The general principle of the invention is to transmit a determined signal pattern before a transmission of data frames. The purpose of this "precursor" signal is to set all units on the bus into a state of alert so that the units start up. During the precursor signal no other data are accepted on the bus. The precursor signal is chosen to be long enough to ensure that each of the units has started up at its end. After the precursor signal has been terminated every unit in the network is able to receive and to transmit data on the bus.

In other words, the invention relates to a marker (reference 7 in FIG. 3) in the bit stream, wherein the marker is unique enough to be clearly identified from other data fields (e.g., FIG. 3, frame 4, delimiter 6) in the stream, no matter at which frequency two (or more) nodes (e.g., master or slave units) in the network operate. The marker marks the beginning of a known bit pattern (cf. synch bit 8, FIG. 2B, part of frame 4), that can be used to measure the time base of a master clock relatively to the slave clock. The kind of information located behind the bit pattern (i.e., transmitted thereafter) is not essential. Preferably, the marker comprises of a number of consecutive dominant (e.g., logical "0") or a number of consecutive recessive (e.g., logical "1") bits. To make the pattern of the marker unique in every respect, the marker has to be longer than any other valid bit-pattern that might appear on the bus.

Preferably, the marker itself does not provide means to adjust the clocks. Adjusting the clocks can be achieved by following known bit pattern with rising and falling edges at predefined distances (e.g., in synch bit 8, FIG. 2B).

Thus, according to the invention the method for communicating data between at least two units on a serial bus in a car, wherein the units have independent clocks, said data being transmitted as a sequence of frames, each frame including an identifier field and a data field, is characterized in that prior to any sequence of frames a signal pattern is transmitted on the bus for a predetermined period of time, so as to set the bus, to a definite state.

Preferably, the length of the bit pattern depends on the length of the longest possible valid bit pattern that might appear on the bus, the maximum clock frequency of a node in the network relatively to the master clock, and the minimum clock frequency of a node in the network. Preferably, the length is variable and can be adjusted to the hardware conditions in a given network.

According to a first preferred embodiment, the signal pattern is a constant logic low. In an alternative preferred embodiment the signal pattern is a constant logic high.

In the following a detailed description of a preferred mode of operation of the invention is given by way of example. It should be understood that the invention is not limited to the embodiments of the following description.

Referring to FIG. 1, a plurality of unit, 1 are coupled to a serial bus 2. The network of FIG. 1 is a hierarchical network, that is a master unit $1_m$ (left in FIG. 1) controls the protocol on the bus 2 and several slave units $1_s$ (right in FIG. 1) respond to instructions from the master unit 1. The master unit $1_m$ performs a master task and a slave task. For example, in the master task, the master unit In polls the status information of the slave units $1_s$ in regular intervals. information on the bus 2. However, the invention is not limited to hierarchical networks but is also applicable to "flat" networks with a common level of all units 1.

Figure 2A:
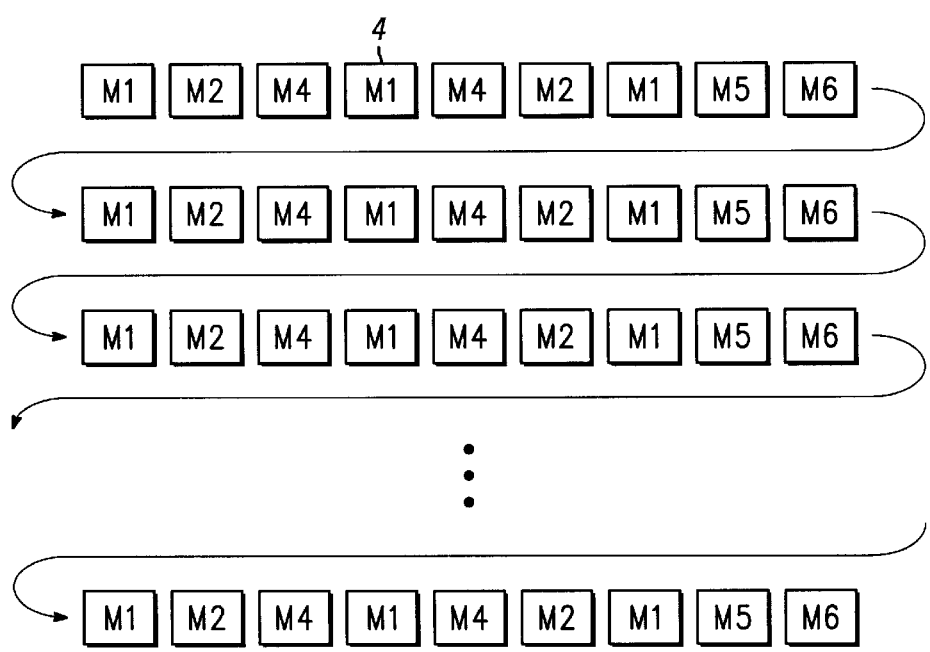
FIG. 2A is an illustration of a prior art sequence of frames on the bus.

In a network according to FIG. 1 the data are transmitted as a sequence 3 of frames 4. In FIG. 2A an example of the order of such sequence is illustrated. A unit 1 with an address "1" transmits a frame M1 on the bus 2, another unit 1 with an address "2" transmits a frame M2 on the bus, still another unit 1 with an address "4" transmits a frame M4 on the bus, etc. The sequence 3 of FIG. 2A is thus M1, M2, M4, M1, M4, M2, M1, M5, M6, . . . . The frames 4 are separated from each other by intervals (not shown).

An example for frame 4 is shown in detail in FIG. 2B. The example is intended to be non-limiting. Persons of skill in the art can implement frame 4 in a different way without departing from the scope of the present invention.

Besides the data to be transmitted the frames M1, M2, comprise a header with a synch field 8 and an identifier field 9. The header is read by each of the units 1 on the bus 2. The synch field 8 synchronizes the units 1. But the data normally concern only one of the units receiving the frame. Therefore, the identifier field 9 is to identify the appropriate receiver of the frame 4. The identifier field is substantially an address. Each of the units compares the contents of the identifier field with its own address. If the result of the comparison is negative the unit disregards the following data. If the result of the comparison is positive the unit reads the data in the subsequent data fields 10 after the header. The data fields 10 convey the data to be transmitted. Finally, a check field 11 is provided for error diagnosis of the conveyed data. A header delimiter 12 may be inserted after the header 8, 9 before the first data field 10.

Communicating data between at least two units 1 on a serial bus 2 is particularly difficult in a car. In a car the units 1 which are coupled to the bus 2 of a common network are often of different type. They may come from different manufacturers and have independent clocks. Further, they are subject to fluctuations of characteristic values due to temperature variations which cover a particularly broad range in a car. Nevertheless, all units have to comply with the protocol on the bus which requires an exact timing of data fields and header fields.

To avoid expensive solutions as crystal based oscillators and/or calibration of the units, a new arrangement of the sequence of frames is suggested.

The sequence of frames according to the invention is illustrated in FIG. 3. The sequence comprises the frames 4 as shown in FIG. 2B. The frames are separated from each other by delimiters 6. After a sequence has been communicated on the bus 2 indefinite periods 5 of idle time may occur on the bus. These are indicated at the right end and left end of the sequence in FIG. 3, respectively. In the periods 5 of idle time at least some of the units 1 may change to a "sleep" mode or stand-by mode in which they do not respond to instructions on the bus immediately. Before the unit 1 which is in a stand-by mode can receive a frame, it first has to return to its activated state. In the prior art, a first frame is on the bus already at the end of the idle time. However, at that time some of the units may still be in their start up phase. Thus data of the first frame may get lost if one of the units in the start up phase is the destination. In order to avoid such loss of data the units 1 need all to be activated at almost the same time such that they are capable of receiving even the very first frame of a sequence, irrespective of their different types of clocks.

According to the present invention a signal pattern 7 ("marker") is transmitted on the bus 2 prior to any sequence 3 of frames 4. By this "precursor" signal 7 the bus is set to a definite state. The bus 2 is in this definite state as long as the signal pattern 7 is applied. No other data are accepted on the bus 2 during this time. Since the definite state of the bus lasts longer than any data field this definite state is recognized by all off the units 1 as a start up signal: upon receipt of the precursor signal the units 1 return from their stand-by mode into their active mode. Only after the signal pattern 7 has been terminated, the first frame of a sequence of frames will be communicated on the bus 2.

It is essential to the method that the period of the signal pattern 7 is sufficiently long so that each of the units 1 recognizes it as an instruction to return to the active mode. On the other hand, the period of the signal pattern 7 must not be too long, since otherwise the units may change to the stand-by mode again.

In other words, the nodes should not return into sleep mode (at least not in the dominant mode) when the signal is applied too long.

The signal marks the beginning of a frame (e.g., frame 4 with SYNCH BYTE 8, cf. FIG. 2B). In other words, the toggle edge (dominant to recessive, or vice versa) of the signal pattern indicates the begin of message sequence 4, 6. Preferably, the slave unit goes into an alert state (ready to receive or to send messages) after the signal pattern has toggled.

Thus, in a first embodiment of the invention the period of the signal pattern 7 is a multiple of the ratio of a maximum clock rate of the units 1 and a minimum clock rate of the units 1. This can be written as:

$$t(signal\ pattern) > \frac{t(basic) * n * F(\max)}{F(\min)} \quad (1)$$

where t(signal pattern) is the period (duration) of the signal pattern 7, t(basic) is a basic time, i.e. the interval of a bit, n is a number of bits in the data field 10 in the frame 4, and F(max)/F(min) is the ratio of the maximum clock rate F(max) of all units 1 and the minimum clock rate F(min) of all units 1. Clock rates F(min) and F(max) are considered as factors indicating whether a clock operates faster or more slowly than a nominal clock. For example, the nominal clock provides a rectangular signal with a 50% duty cycle (equal "1" and "0" times) and a period time T=0.1 ms (milli seconds, "1" and "0" times together) and a frequency f(nominal)=1/T=10 kHz (kilo hertz). For example, F=1.15 indicates that the actual frequency is f(actual)=1.15*10 kHz=11.5 kHz (−15% deviation). Convenient values are, F(min)=0.85 and F(max) 1.15. However, this is not essential. A bus system operating according to the present invention can accommodate other values for higher tolerances.

Since time discrete signals can only be counted by integer numbers, the following formula is used in a preferred embodiment:

$$t(\text{signal pattern}) > \frac{\text{ceiling } [t(\text{basic}) * n * F(\text{max})]}{F(\text{min})} \quad (2)$$

wherein the function "ceiling[ ]" stands for rounding up to the next higher integer value.

Whenever a new unit 1 is coupled to the bus 2 in this embodiment of the invention the respective clock rate is examined so as to determine the new ratio of the maximum and minimum clock rate of all units. According to the new ratio the period of the signal pattern 7 is updated then.

In another embodiment of the invention the ratio of the maximum clock rate of all units and the minimum clock rate of all units is set to a predetermined value, irrespective of the actual ratio. It has turned out that the object of the invention is achieved with a ratio of greater than four. With this ratio the period of the signal pattern 7 is greater than four times the period of the data field 10, assuming that n in equations (1) and (2) is the number of bits in the data field 10. With a ratio of greater than four even the "worst" case of a "slow" transmitter unit with half the nominal frequency and a "fast" receiver unit with twice the nominal frequency is covered: the signal pattern 7 can not be mistaken with a data field 10 which has accidentally the same pattern of bits as the signal pattern 7 (e.g. n zeros or n ones). The period of the signal pattern 7 t(signal pattern) according to this embodiment is thus given by:

$$t(\text{signal pattern}) > t(\text{basic}) * n * 4 \quad (3)$$

The signal pattern 7 can either be a constant logic low (dominant) or a constant logic high (recessive). Such signals are easy to create and are unique in their meaning. However, it is particularly advantageous to take a constant logic low as the signal pattern 7, since this signal is dominant. Hence, the requirement that no other data are accepted on the bus while the signal pattern 7 is applied is automatically met.

The present invention can also be described as a communication system having at least a first unit (e.g., master unit 1) and a second unit (e.g., any of slave units 2) coupled by a serial bus (cf. FIG. 1) in which the units are independently clocked, and in which the units exchange data in frame sequences 3, 4 (cf. FIG. 2A) with identifier field (9) and data field (10) (cf. FIG. 2B). In the communication system, first unit 1 transmits for a predetermined period of time (see equations (1) to (3)) signal pattern 7 to the bus prior to any sequence 3, 4 to set the bus to a definite state. Preferably, the predetermined period of time is a multiple of the ratio of the maximum clock rate and the minimum clock rate of any unit (cf. equation (1). A preferred value for multiplication is 4. In other words, the predetermined period is at least four times as long as data field 10 of frame 4 in sequence 3.

With the invention a maximum possible data transmission bandwidth is achievable even with inaccurate clock sources. The present invention provides the most effective use of the bus bandwith with given tolerances of the slave clocks. This is achieved by having the marker field 7 (cf. FIG. 3) as long as necessary and as short as possible.

What is claimed is:

1. A method of communicating data between at least two units on a serial bus in a car, wherein the units have independent clock frequencies, said method comprising the following steps:

transmitting on the bus a signal pattern for a predetermined period of time to set the bus to a definite state; and transmitting data by a sequence of frames, each frame including an identifier field and a data field comprising bits, wherein the predetermined period of time for transmitting the signal pattern on the bus is substantially given by the relation $$t(\text{signal pattern}) > \frac{\text{ceiling } [t(\text{basic}) * n * F(\text{max})]}{F(\text{min})},$$

where t(signal pattern) represents the predetermined period of time for transmitting the signal pattern on the bus, ceiling represents rounding up) to next higher integer, t(basic) represents an interval of one of the bits, n represents the number of bits in the data field, F(max) represents a maximum frequency of the independent clock frequencies and F(min) represents a minimum frequency of the independent clock frequencies.

2. Method according to claim 1, wherein the predetermined period of time is a multiple of the ratio of a maximum clock rate of all units and a minimum clock rate of all units.

3. Method according to claim 2, wherein the predetermined period of time is at least four times as long as the data field of the frame.

4. Method according to claim 1, wherein the signal pattern is a constant logic low.

5. Method according to claim 1, wherein the signal pattern is a constant logic high.

6. Method according to claim 1, wherein said signal pattern has a constant logical level on said bus and wherein the end of said signal pattern is given by a toggling edge.

7. Method according to claim 6, wherein the slave goes into an alert state after the signal pattern has toggled.

8. A communication system at least comprising, a first unit; and a second unit coupled to said first unit by a serial bus, said first and second units being clocked at independent clock frequencies, said first and second units exchanging data in frame sequences having identifier field and data field comprising bits, said first unit prior to any sequence transmitting—for a predetermined period of time—a signal pattern to the bus to set the bus to a definite state, wherein the predetermined period of time for transmitting the signal pattern on the bus is substantially given by the relation $$t(\text{signal pattern}) > \frac{\text{ceiling } [t(\text{basic}) * n * F(\text{max})]}{F(\text{min})},$$

where t(signal pattern) represents the predetermined period of time for transmitting the signal pattern on the bus, ceiling represents rounding up to next higher integer, t(basic) represents an interval of one of the bits, n represents the number of bits in the data field, F(max) represents a maximum frequency of the independent clock frequencies and F(min) represents a minimum frequency of the independent clock frequencies.

9. The communication system of claim 8, wherein said predetermined period of time is a multiple of the ratio of the maximum clock rate and the minimum clock rate of any unit.

10. The communication system of claim 9, wherein said predetermined period of time is at least four times as long as the data field of a frame in said sequence.

\* \* \* \* \*

UNITED STATES PATENT AND TRADEMARK OFFICE
CERTIFICATE OF CORRECTION

PATENT NO. : 6,598,107 B1
DATED : June 22, 2003
INVENTOR(S) : Hans Christian Von Der Wense et al.

It is certified that error appears in the above-identified patent and that said Letters Patent is hereby corrected as shown below:

<u>Column 6,</u>
Line 11, delete ")" after "up".

Signed and Sealed this

Sixteenth Day of March, 2004

JON W. DUDAS
*Acting Director of the United States Patent and Trademark Office*